United States Patent [19]

Itani

[11] 4,137,979

[45] Feb. 6, 1979

[54] ELECTRONIC WEIGHING APPARATUS

[75] Inventor: Seiichi Itani, Sakai, Japan

[73] Assignee: Kubota, Ltd., Osaka, Japan

[21] Appl. No.: 823,289

[22] Filed: Aug. 10, 1977

[30] Foreign Application Priority Data

Aug. 25, 1976 [JP] Japan .................................. 51-101929

[51] Int. Cl.² ............................................. G01G 3/14
[52] U.S. Cl. ........................... 177/210 R; 177/DIG. 3
[58] Field of Search .................... 177/210 R, DIG. 3

[56] References Cited

U.S. PATENT DOCUMENTS 4,044,846  8/1977  Matilainen .................. 177/210 R X

FOREIGN PATENT DOCUMENTS 2349747  4/1974  Fed. Rep. of Germany .... 177/DIG. 3

Primary Examiner—George H. Miller, Jr.
Attorney, Agent, or Firm—W. G. Fasse; D. F. Gould

[57] ABSTRACT

The present electronic weighing apparatus comprises a load convertor, a direct current amplifier for amplifying the converted output, an analog-digital converter controlled by an enable signal for the analog-digital converting of the output from the dc amplifier, an enable signal generator for providing a periodical conversion enable signal to the analog-digital converter, and a digital display for displaying the output from the analog-digital converter. A zero tracking circuit is connected between the A/D converter and the display and comprises a storing circuit responsive to a store enable signal for storing the output from the analog-digital converter, a digital subtracter for evaluating the difference between the output from the analog-digital converter and the output from the storing circuit. The output from the digital subtracter is applied to the digital display as the weighed output. A zero judging or sensing circuit determines whether the output from the digital subtracter is zero. A threshold level detector detects when the output from the digital subtracter exceeds a predetermined threshold value, and a retriggerable monostable multivibrator normally assumes the "one" storing state and is responsive to the simultaneous occurrence of the zero sensed output or the threshold detected output and the conversion enable signal and is triggered to assume the other state for a predetermined time period. Said "one" state of the monostable multivibrator at any time other than said predetermined time period is applied to the storing circuit as a store enable signal, thereby to renew the data in the storing circuit.

18 Claims, 9 Drawing Figures (a)

(b)

ELECTRONIC WEIGHING APPARATUS

BACKGROUND OF THE INVENTION

1. Field of the Invention

The present invention relates to an electronic weighing apparatus. More specifically, the present invention relates to a zero tracking circuit in an electronic weighing apparatus.

2. Description of the Prior Art

A typical prior art electronic weighing appratus comprises a load converter responsive to a load being weighed for generating an electrical analog signal representative of the load, a direct current amplifier for amplifying the output from the load converter, an analog-digital converter for converting the electrical analog signal from the direct current amplifier into an electrical digital signal, and a digital display responsive to the electrical digital signal from the analog-digital converter for displaying the load or weight in a digital manner. The load converter may comprise a resistor wired bridge type load cell, for example.

Such an electronic weighing apparatus of a relatively simple structure is subject to a minor fluctuation of the zero point of the output by virtue of the environmental changes such as of temperature, humidity and the like and the time dependent changes of the characteristics of the components. Such a minor fluctuation brings about a situation where some output is displayed in the digital display although no load has been placed on the load converter.

An improved prior art electronic weighing apparatus where the above described problem as to a minor fluctuation of the zero point has been solved is shown in FIG. 1. Referring to FIG. 1, the prior art electronic weighing apparatus comprises a load converter 1 responsive to a load being weighed for generating an electrical analog signal representative of the load, a direct current amplifier 2 for amplifying the output from the load converter 1, an analog-digital converter 3 of a conversion enable signal controlled type for converting the electrical analog signal from the direct current amplifier into a corresponding electrical digital signal, a periodical enable signal generator 4 for providing periodically a conversion enable signal to the analog-digital converter 3, and a digital display 9 responsive to the electrical digital signal for displaying the value in a digital manner. A zero tracking circuit 5 is provided for eliminating the above discussed problem of a minor fluctuation of the zero point between the analog-digital converter and the digital display 9. The zero tracking circuit 5 comprises a store circuit 6 responsive to a store enable signal for storing an electrical digital signal from the analog-digital converter 3, a digital subtracter 7 for receiving the electrical digital signal from the analog-digital converter 3 at the minuend input and for receiving the electrical digital signal stored in the store circuit 6 at the subtrahend terminal, and a store enable signal generator 8 for providing a store eneble signal to the store circuit 6. The store enable signal generator 8 may be manually operable to provide a store enable signal in response to manual operation.

In operation, prior to the measurement, the store enable signal generator 8 is manually operated for the purpose of zero tracking. A store enable signal is applied from the store enable signal generator 8 to the store circuit 6, whereby the store circuit 6 serves to store the output from the analog-digital converter 3. Since in such a situation no load has been placed on the load converter 1, the electrical analog signal representative of the zero point fluctuated value obtainable from the load converter 1 in such a situation is applied to the direct current amplifier and the zero point fluctuation value, as amplified, is applied to the analog-digital converter 3. The analog-digital converter 3 is responsive to the conversion enable signal from the conversion enable signal generator 4 to cause the analog-digital conversion of the above described zero point fluctuation value, whereby an electrical digital signal representative of the zero point fluctuation value is generated. Thus, it is understood that if and when the store enable signal generator 8 is operated while no load is placed on the load converter 1, an electrical digital signal representative of the above described zero point fluctuation value is stored in the store circuit 6.

Then an article to be weighed is placed on the load converter 1. An electrical analog signal representative of the load is obtained from the load converter 1 and is applied to the direct current amplifier 2. The electrical analog signal, as amplified, is converted into an electrical digital signal by means of the analog-digital converter 3 as a function of the conversion enable signal. The electrical digital signal representative of the load obtainable from the analog-digital converter 3 is applied to the minuend input of the digital subtracter 7. On the other hand, the electrical digital signal representative of the zero point fluctuation value as stored in the store circuit 6 is applied to the subtrahend input of the digital subtracter 7. As a result, the digital subtracter 7 subtracts the electrical digital signal representative of the above described zero point fluctuation value from the electrical digital signal representative of the load after the article being weighed has been placed on the load converter 1, thereby to provide an electrical digital signal corresponding to the difference and as compensated relative to the zero point fluctuation to the digital display 9. Thus, the digital display 9 displays the load of the article being weighed as compensated relative to the zero point fluctuation.

According to the FIG. 1 zero tracking circuit, when the store enable signal generator 8 is manually operated, the zero point fluctuation value is unconditionally stored in the store circuit 6 irrespective of any periodicity of the zero point fluctuation. As a result, an instantaneous fluctuation of so small a period that does not affect the weighing measurement, such as a noise, a pulsing load, a minor vibration and the like, is also treated as a zero point fluctuation and the electrical digital signal from the analog-digital converter 3 corresponding to such an instantaneous fluctuation is also stored in the store circuit 6 and hence the digital subtracter 7 subtracts the electrical digital signal caused by such an instantaneous fluctuation, from the electrical digital signal corresponding to the load after the article being weighed is placed on the load converter 1. However, such an instantaneous fluctuation that does not affect the weighing measurement should be inherently disregarded. Thus, with the FIG. 1 zero tracking circuit, a problem is encountered that such an instantaneous fluctuation that should be disregarded is also treated as a zero point fluctuation, thereby to make compensation, resulting in an error in the weight measurement.

SUMMARY OF THE INVENTION

Briefly described, the present invention comprises an electronic weighing apparatus which comprises means responsive to a load being weighed for generating an electrical analog signal representative of the load; analog-digital converting means responsive to said electrical analog signal generating means for converting said electrical analog signal into an electrical digital signal; store or memory means operatively coupled to said analog-digital converting means and responsive to a store enable signal for storing said electrical digital signal from said analog-digital converting means; difference evaluating means responsive to said analog-digital converting means and to said store means for evaluating the difference between the electrical digital signal from said analog-digital converting means and said electrical digital signal output stored in said store means; digital display means for displaying the output from said difference evaluating means in a digital manner; and means for providing a store enable signal to said store means; said store enable signal providing means comprising means responsive to said difference evaluating means for judging or sensing the zero of the difference output for providing a zero judging sensing output; means responsive to said difference evaluating means for level detecting said difference output at a predetermined threshould value for providing a threshold detecting output; timing means operatively coupled to said zero sensing means and said threshold detecting means to be triggered in response to at least one of said zero sensing output and to a threshold detecting output for providing a timing operation of a predetermined time period; and means responsive to said timing means for providing a store enable signal to said store means for a time period other than said predetermined time period.

In a preferred embodiment, said anlog-digital converting means comprises means for periodically generating a conversion enable signal and analog-digital converting means of an enable signal controlled type responsive to a conversion enable signal for converting said electrical analog signal into said electrical digital signal. Means is further provided which is responsive to the simultaneous occurrence of at least one of said zero judging output and said threshold detecting output and said periodical conversion enable signal for triggering said timing means.

According to the present invention, a store enable signal is automatically generated in accordance with a predetermined condition and is applied to the store means. More specifically, the store enable signal is applied to the store means when the output from the difference evaluating means is larger than zero but smaller than a predetermined value, but the store enable signal is prevented from being applied to the store means for a predetermined time period if and when the output from the difference evaluatiog means is zero or exceeds the predetermined threshold value, whereby the store means is disabled. The reason why the store means is disabled for a predetermined time period responsive to the output from the difference evaluating means being zero, is that compensation of the zero point fluctuation is not required any more in such a situation where the output from the difference evaluating means has already reached the zero state. If in such a state the apparatus had been still brought in a state where the zero point fluctuation can be compensated, then the measurement could have been affected by an instantaneous fluctuation of such a small period that does not affect the weight measurement. In other words, according to the present invention, a store enable signal is prevented from being generaged for a predetermined time period responsive to the output from the difference evaluating means having reached the zero state, so that an instantaneous fluctuation of such a small period that does not affect the weight measurement may be disregarded. On the other hand, when the output from the difference evaluating means exceeds a predetermined threshold value, this means that an article being weighed is placed on the load converting means and as a result an abrupt change of the load has been caused. In such a situation, again compensation of the zero point fluctuation must be interrupted. Thus, the store enable signal is again prevented from being generated in response to the output from the difference evaluating means having exceeded the predetermined threshold value, so that the store means may be disabled. Thus, according to the present invention, generation of the store enable signal is automatically conditioned or selected in consideration of the output from the difference evaluating means. As a result, the inventive zero tracking circuit of the invention becomes immune from an instantaneous fluctuation in the output from the difference evaluating means that is of such a small period that does not affect the weight measurement.

The above described predetermined time period which is contemplated to condition the generation of the store enable signal in consideration of the output from the difference evaluating means is selected with due regard to an instantaneous fluctuation of such a small interval that could occur in actuality and does not affect the weight measurement. Preferably, such a time period is selected in the range of 0.5 through 2 seconds. More preferably, such a time period is selected in the range of 0.75 through 1.5 seconds.

Therefore, a principal object of the present invention is to provide an electronic weighing apparatus comprising a zero tracking circuit which is adapted to selectively store the fluctuation of the zero point.

Another object of the present invention is to provide an electronic weighing apparatus comprising a zero tracking circuit which is immune to an instantaneous fluctuation of such a small period that does not affect the weight measurement.

A further object of the present invention is to provide an electronic weighing appartus comprising a zero tracking circuit which does not respond for a predetermined time period after the zero point fluctuation has reached a zero point steady state.

Still a further object of the present invention is to provide an electronic weighing apparatus comprising a zero tracking circuit which is adapted to be responsive to variations of the weight measured value having exceeded a predetermined threshold value to determine a weight measuring state and to disable compensation of the zero point fluctuation for a predetermined time period.

Still another object of the present invention is to provide an electronic weighing apparatus comprising a zero tracking circuit which is adapted to disable the compensation of the zero point fluctuation for a predetermined time period in consideration of the fluctuation of the weight measured value, wherein the predetermined time period is selected to be a value within the range which is most preferred with respect to an instantaneous fluctuation of such a small duration that it does not affect the weight measurement.

These objects and other objects, features, advantages and aspects of the present invention will become more apparent from the following detailed description of the present invention when taken in conjunction with the accompanying drawings.

DESCRIPTION OF THE PREFERRED EMBODIMENTS

Figure 1:
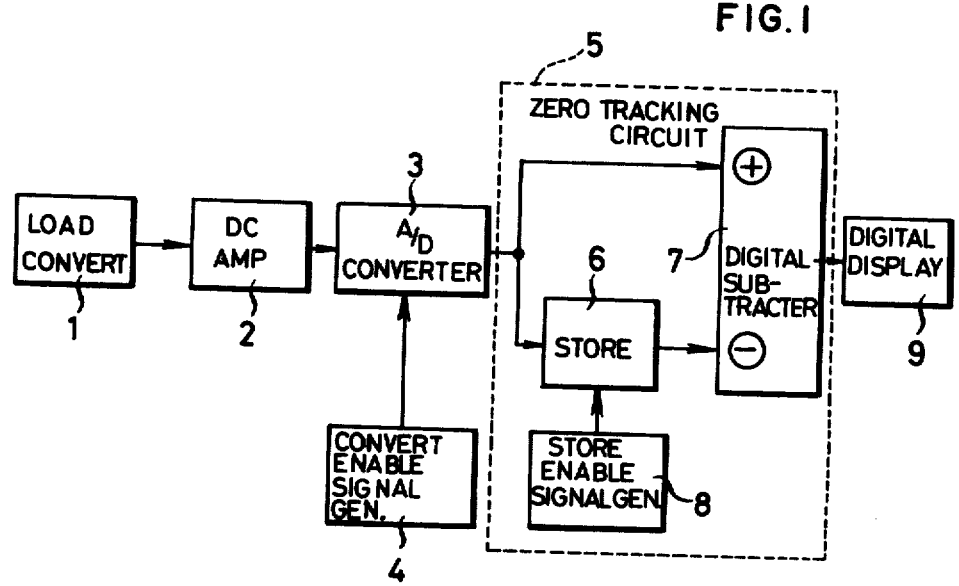
FIG. 1 shows a block diagram of a prior art electronic weighing apparatus comprising a typical zero tracking circuit wherein the present invention may be advantageously employed.
Figure 2:
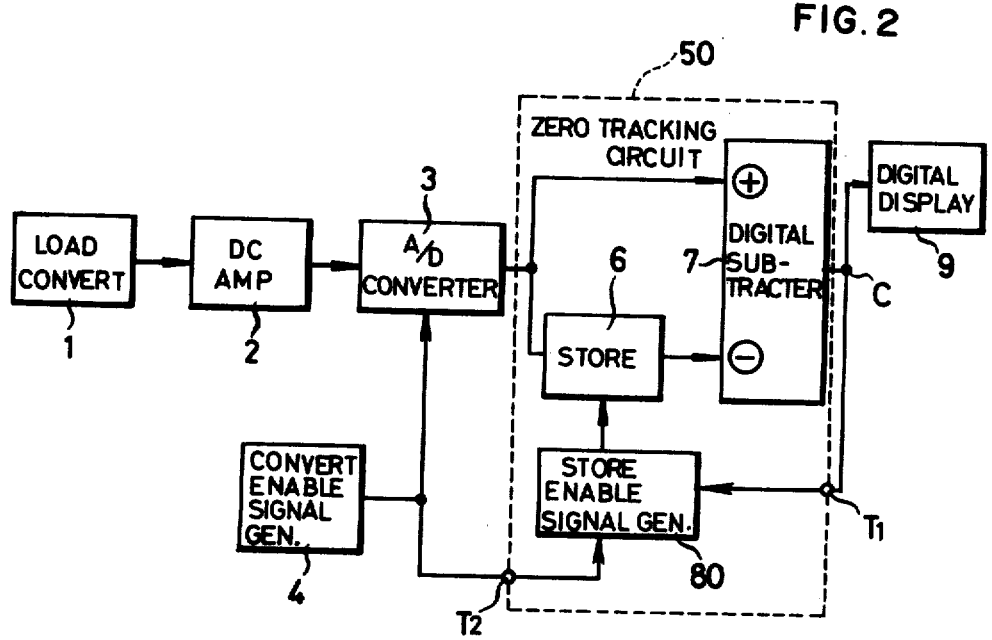
FIG. 2 is a block diagram of an electronic weighing apparatus comprising zero tracking circuit in accordance with the present invention.

FIG. 2 shows a block diagram of an electronic weighing apparatus employing the inventive zero tracking circuit. Since the major portion of the FIG. 2 embodiment is substantially the same as that of the FIG. 1 circuit, like portions have been denoted by like reference characters. According to the FIG. 2 embodiment, the store enable signal generator 80 is responsive to the output from the digital subtracter 7. To that end, the output C from the digital subtracter 7 is applied through a terminal T1 to the store enable signal generator 80. According to a preferred embodiment, the store enable signal generator 80 is also responsive to a periodical conversion enable signal obtainable from the periodical conversion enable signal generator 4. To that end, the output from the conversion enable signal generator 4 is applied through a terminal T2 to the store enable signal generator 8.

According to the present invention, the store enable signal generator 80 is responsive to the subtraction output from the digital subtracter 7 to conditionally or selectively generate a store enable signal as a function of the variation of the output from the digital subtracter 7. More specifically, the store enable signal generator 80 generates a store enable signal such that an instantaneous fluctuation of such a small duration that it does not affect the weight measurement by sensing the periodicity and magnitude of the variation of the output C from the subtracter 7. Accordingly, the store circuit 6 is responsive to such a selectively generated store enable signal to restore the electrical digital signal from the analog-digital converter 3, thereby to renew the stored data only if the same is necessary.

As described in more detail subsequently, the store enable signal generator 80 is responsive to the output C from the digital subtracter 7 to be suppressed from generating the store enable signal for a predetermined time period if and when the output C has reached the zero state or exceeded a predetermined threshold value while the same normally generates a store enable signal during any time period other than said predetermined time period. As a result, if and when no article is placed on the load converter of the electronic weighing apparatus of the FIG. 2 embodiment due to the initial condition and the zero point fluctuation has reached the steady state, then a store enable signal is not generated, whereby the store circuit is disabled, with the result that in a steady state of the zero point fluctuation the zero tracking circuit is made immune to an instantaneous fluctuation of such a small duration that it does not affect the weight measurement. If and when the output C of the digital subtracter 7 shows a fluctuation that exceeds a predetermined threshold value, such a fluctuation is regarded as indicating that an article being weighed is placed on the load converter and hence the electronic weighing apparatus is in the weight measuring condition, and thus the store enable signal is prevented from being generated, whereby the store circuit 6 is disabled. As a result, the zero tracking circuit 50 is controlled to interrupt the operation of compensating the zero point fluctuation during such a weight measuring operation. Accordingly, during such a weight measuring operation the zero tracking circuit is made immune to an instantaneous fluctuation of such a small duration that it does not affect the weight measurement. For the purpose of periodically initiating the above described time period, the conversion enable signal is utilized, in a manner to be more fully described subsequently.

Since the operation of the other portions in the FIG. 2 embodiment is substantially the same as that in the FIG. 1 circuit, it is not believed necessary to describe it again in detail.

Figure 3:
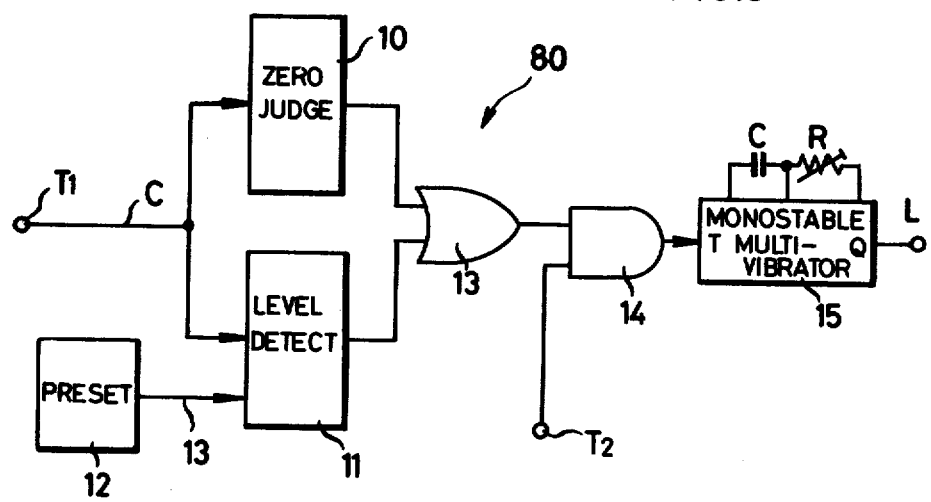
FIG. 3 is a block diagram showing in more detail the store enable signal generator 80 in the zero tracking circuit of the FIG. 2 embodiment.

FIG. 3 is a block diagram showing in more detail the store enable signal generator 80 of FIG. 2 embodiment. The store enable signal generator 80 comprises a zero judging or sensing circuit 10 responsive to the output C from the digital subtractor 7 to provide the high level output if and when the output C is zero, a threshold value detecting circuit 11 responsive to the output C from the digital subtractor 7 to provide a high leve output if and when the output C exceeds a predetermined threshold value B, an OR gate 13 connected to receive the outputs from the zero judging or sensing circuit 10 and the threshold value detecting circuit 11, an AND gate 14 connected to receive the conversion enable signal from the conversion enable signal generator 4 and the output from the OR gate 13, and a retriggerable multivibrator 15 connected to be triggered in response to the output from the AND gate 14. The threshold value detecting circuit 11 is provided with a threshold value presetting circuit 12 for presetting the above mentioned threshold value B. The multivibrator 15 is operatively coupled to a time constant circuit comprising a resistor R and a capacitor C' such that the multivibrator assumes a reversed state for a predetermined time period determinable by the time constant circuit responsive to a trigger signal applied to a trigger input terminal T of the multivibrator 15. An output is withdrawn from the output terminal Q which assumes the low level for the above described reversed state period τ and assumes the high level for the time period other than the above described reversed state period, and is applied as a store enable signal to the store circuit 6.

Figure 4:
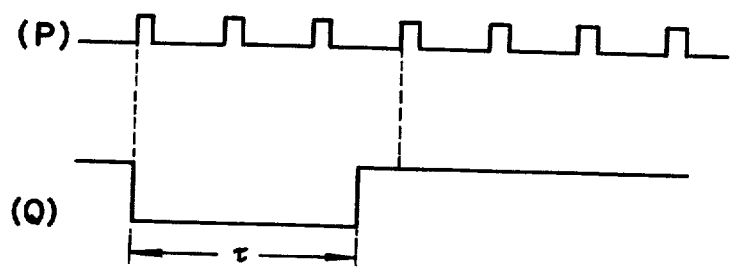
FIG. 4 shows waveforms of various signals for use in explanation of the operation of the FIG. 3 embodiment.
Figure 4:
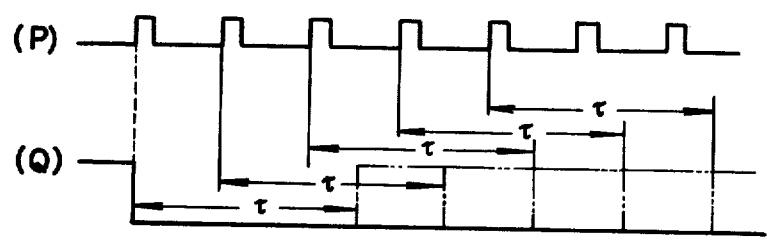

Referring to FIG. 3, if and when the output C from the digital subtractor 7 reaches a steady state of the zero point fluctuation, the output of the zero judging or sensing circuit 10 assumes the high level. If and when the output C from the digital subtractor 7 includes a fluctuation that exceeds a threshold value B preset by the presetting circuit 12, the output from the threshold value detecting circuit 11 assumes the high level. In either event, the output from the OR gate 13 assumes the high level. In such a situation, if and when a conversion enable signal is further obtained through the terminal T2 from the conversion enable signal generator 4, the output from the AND gate 14 assumes the high level each time the conversion enable signal is received periodically. The monostable multivibrator 15 is triggered response to such a high level signal. FIG. 4(a) shows waveforms of the conversion enable signal P and the output Q from the monostable multivibrator 15. The time period when the state of the monostable multivibrator 15 is reversed depends on the time constant determinable by the resistor R and the capacitor C'. Such a reversed state period τ is selected to be longer than the repetition interval of the conversion enable signal obtainable from the conversion enable signal generator 4. The monostable multivibrator 15 is retriggerable, as described previously. Accordingly, during the time period when the output from the OR gate 13 is at the high level, the output from the AND gate 14 assumes the high level each time when the conversion enable signal is received at the terminal T2, whereby the monostable multivibrator 15 is triggered repeatedly. FIG. 4(b) shows waveforms of the output from the AND gate 14 depending on the conversion enable signal P and the output of the monostable multivibrator 15, as retriggered. Thus, insofar as the high level output is obtained from either the zero sensing circuit 10 or the threshold value detecting circuit 11, the high level output is also obtained from the OR gate 13 and the monostable multivibrator 15 is retriggered at each occurrence of the conversion enable signal so that the state is reversed to be held for the time period τ. Referring to FIG. 4, the output Q of the monostable multivibrator 15 is applied as a store enable signal to the store circuit 6, so that the high level signal serves to enable a storing operation whereas the low level serves to disable the storing operation.

In operation, first let it be assumed that the output C from the digital subtractor 7 does not include at all my fluctuation of the zero point and thus C equals zero. Accordingly, the output from the zero sensing circuit 10 assumes the high level and thus the output from the OR gate 13 also assumes the high level. Accordingly, the output from the AND gate 14 assumes the high level each time when the conversion enable signal is received periodically, whereupon the monostable multibivrator 15 is triggered repeatedly. Therefore, the output Q of the monostable multivibrator 15 is reversed of the state so that the output is changed from the high level to the low level, thereby to disable renewal of the new data in the store circuit 6. If and when the monostable multivibrator 15 is retriggered within the time period τ of the monostable multivibrator 15, the reversed state period τ is initiated, whereby the low level stae of the output Q of the monostable multivibrator 15 is continued and the store circuit is kept disabled of the data renewal.

Assuming that a zero point fluctuation has occurred which is smaller than the above described predetermined threshold value B and continues longer than the time constant determinable by the resistor R and the capacitor C' of the monostable multivibrator 15, the output from the zero sensing circuit 15 assumes the low level while the output from the threshold value detecting circuit 11 is also at the low level. Therefore, the output from the OR gate 13 is also at the low level. Accordingly, the conversion enable signal received at the terminal T2 is not allowed to pass through the AND gate 14 and hence the monostable multivibrator 15 is not triggered. Accordingly, the output Q of the monostable multivibrator 15 remains at the high level and the high level output from the monostable multivibrator 15 is applied as a store enable signal to the store circuit 6. Therefore, the store circuit 6 stores the electircal digital signal from the analog-digital converter 3 continuously, whereby the store circuit 6 achieves a renewal of the latest data. Such a state continues until the output C from the digital subtractor 7 does not include any fluctuation of the zero point so that the high level output is obtained from the zero sensing circuit 10 or the output C from the digital subtrater 7 exceeds the threshold value B so that the output from the threshold value detecting circuit 11 assumes the high level.

If and when the output C from the digital subtracter 7 becomes larger than the threshold value B preset in the presetting circuit 12, as is typically the case when an article to be weighed is placed on the load converter 1, the output from the threshold value detecting circuit 11 assumes the high level and accordingly the monostable multivibrator 15 is triggered at the repetition interval of the conversion enable signal, whereby the output Q of the monostable multivibrator 15 assumes the low level. In such a state the output C from the digital subtracter 7 clearly exhibits the output corresponding to the load of the article being weighed and data renewal of the store circuit 6 is not necessary. Accordingly, the low level output from the monostable multivibrator 15 disables the store circuit 6.

As mentioned, the time constant of the monostable multivibrator 15 is determined by the values of the resistor R and of the capacitor C'. The time constant is selected to make the zero tracking circuit immune to an instantaneous fluctuation of such a small duration that it does not affect the weight measurement. As a matter of practice, such a time period is preferably selected to be in the range of 0.5 through 2 seconds. However, preferably, such a time interval is selected to be in the range of 0.75 through 1.5 seconds. In consideration of the characteristics of various electronic components now commercially available, the repetition frequency of the convertion enable signal obtained from the conversion enable signal generator 4 is 1 to 10Hz and typically 3Hz. Accordingly, the time constant of the above described monostable multivibrator 15 may be preferably a value covering three to five pulses of the conversion enable signal.

Figure 5:
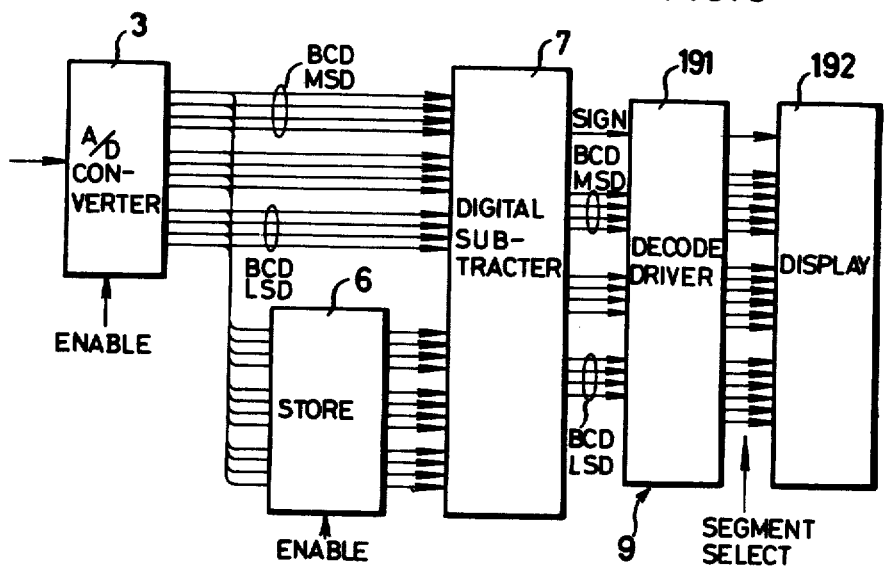
FIG. 5 is a block diagram showing in more detail the analog-digital converter 3, store circuit 6, subtracter 7 and display 9 of the FIG. 2 embodiment.

FIG. 5 is a block diagram showing in more detail the analog-digital converter 3, store circuit 6, digital subtracter 7 and the digital display 9 in the FIG. 2 embodiment. Referring to FIG. 5, the analog-digital converter 3 is responsive to a conversion enable signal and to convert the analog signal into a digital signal of three digits, each digit having a four-bit parallel BCD code. The store circuit 6 comprises a register responsive to a store enable signal to store the input value in a bit parallel fashion and also to output the stored data in a bit parallel fashion. Thus, the register 6 comprises the corresponding bit cells such that the input and output thereof comprise a digital representation of three digits, each having a four-bit parallel BCD code. The digital subtracter 7 comprises the minuend and subtrahend inputs, each comprising a digital representation of three digits and each having a four-bit parallel BCD code. The digital subtracter 7 further comprises an output for providing a signal representative of the sign (plus or minus) of the output from the subtracter 7. The digital display 9 comprises a decode/driver circuit 191 and a numeral display 192, as is well known to those skilled in the art. The numeral display 192 may comprise at each digit position a numeral display unit such as an arrangement of a plurality of segments capable of displaying selectively any one of numerals 0 to 9 by energization of selected segments. A typical example of the segment arrangement may comprise the character "8". The decode/driver 191 decodes, at each digit, the four-bit parallel BCD code signal obtainable from the digital subtracter 7 into a segment selecting signal. A numeral display including a segment arrangement and a decode/driver for selectively driving the arrangement of segment are well known to those skilled in the art.

Figure 6:
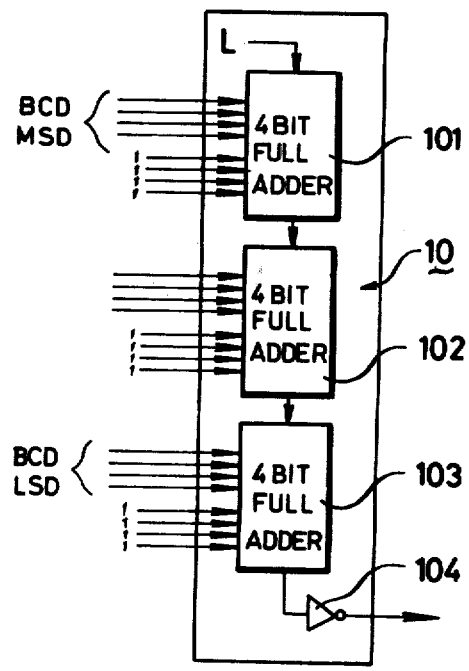
FIG. 6 is a block diagram showing in more detail the zero judging or sensing circuit 10 of the FIG. 3 embodiment.

FIG. 6 is a block diagram showing in more detail the zero sensing circuit 10 of the FIG. 3 embodiment. Referring to FIG. 6, the zero sensing circuit 10 comprises three 4-bit full adders 101, 102 and 103 connected in cascade fashion, each full adder corresponding to each digit of the digital subtracter 7. Each digit of the output from the digital subtracter 7 is connected to the addend input of the corresponding digit full adder 101, 102 or 103 of the zero sensing circuit 10, while the summand input of each full adder 101, 102 or 103 is supplied with a bit parallel input representative of the maximum digital value "1111". A carry input of the full adder 101 is connected to the low level and a carry output of the full adder 101 is connected to a carry input of the adjacent less significant digit full adder 102. A carry output of the full adder 102 is connected to a carry input of the least significant digit full adder 103. A carry output of the full adder 103 is withdrawn through an inverter 104. Since the summand input of each of the full adders 101, 102 and 103 has been supplied with the maximum digital value "1111", if and when an input exceeding zero is applied to the addend input of any digit full adder 101, 102 or 103, a carry occurs and is transferred ultimately to the inverter 104. In other words, only if and when the addend input of all the full adders 101, 102 and 103 are supplied with the digital value zero, the output of the inverter 104 assumes the high level and if and when the addend input of any digit full adder is supplied with a digital value exceeding zero, the output from the inverter 104 assumes the low level.

Figure 7:
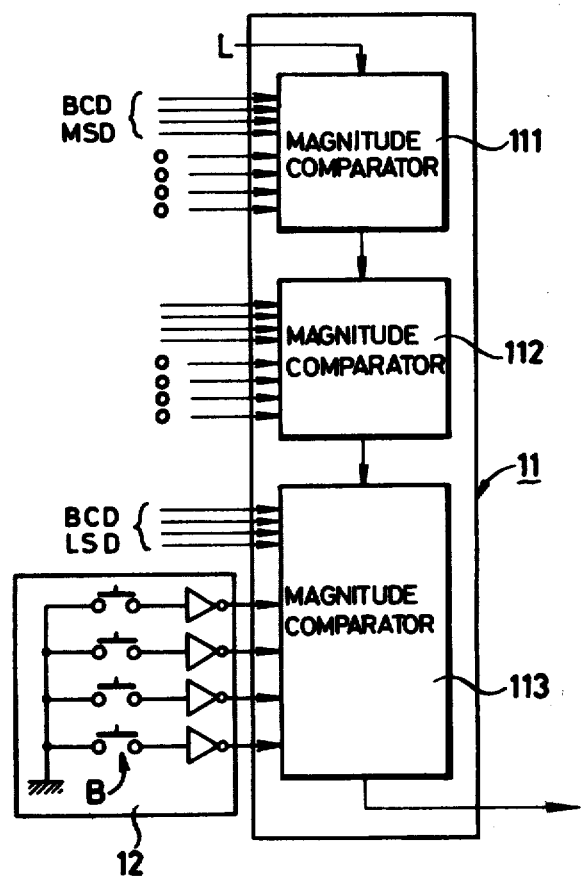
FIG. 7 is a block diagram showing in more detail the threshold detecting circuit 11 and the threshold value setting circuit 12 of the FIG. 3 embodiment.

FIG. 7 is a block diagram showing in more detail the threshold value presetting circuit 12 and the threshold value detecting circuit 11 of the FIG. 3 embodiment. Although the circuit configuration of the threshold value detecting circuit 11 is similar to that of the zero detecting or sensing circuit 10 shown in FIG. 6, each of the blocks 111, 112 and 113 comprises a 4-bit magnitude comparator. A carry input of the most significant digit magnitude comparator 111 is connected to the low level and a carry output of the comparator 111 is connected to a carry input of the adjacent less significant digit magnitude comparator 112. One compare input of the comparator 111 is connected to the corresponding digit output of the digital subtracter 7 and the other compare input of the comparator 111 is supplied with the digital value "0000". One compare input of the magnitude comparator 112 is connected to the corresponding output of digital subtracter 7 and the other compare input of the comparator 112 is supplied with the digital value "0000". A carry output of the comparator 112 is connected to a carry input of the least significant digit magnitude comparator 113. A carry output of the comparator 113 is used as the output of the threshold value detecting circuit 11. One compare input of the comparator 113 is connected to the corresponding digit output of the digital subtracter 7. The other compare input of the comparator 113 is connected to the threshold value presetting circuit 12. The threshold value presetting circuit 12 comprises presetting switches which are connected through the respective inverters to four bit inputs of the other compare input of the comparator 113. As a matter of practice, a possible threshold value to be preset with respect to the range of the decimal values "000" to "999" is a decimal value "002". Accordingly, if a digital value applied to the one input of the comparators 111, 112 and 113 exceeds a decimal value "002" preset in the presetting circuit 12, a carry occurs in the comprators 111, 112 and 113, which is used as a threshold value detecting output.

Figure 8:
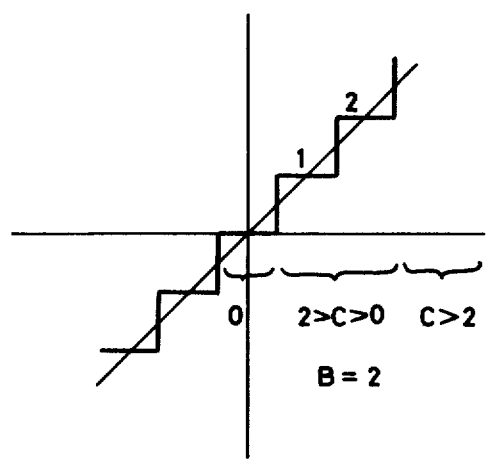
FIG. 8 is a graph showing the characteristic of the inventive apparatus for use in explanation of the operation of the FIG. 7 embodiment.

FIG. 8 is a graph showing a characteristic of the electronic weighing apparatus according to the invention including the zero tracking circuit as practiced in accordance with the embodiment shown in FIGS. 5 to 7. Referring to FIG. 8, the abscissa shows an analog input while the ordinate shows the output C from the digital subtracter 7 which represents a digitalized stepwise change with respect to a change of the analog input. The high level output is obtained from the zero detecting cicuit 10 within the range wherein the digital output C is zero. Since it was assumed that the decimal value "002" is preset in the threshold value presetting circuit 12, the output from the threshold value detecting circuit 11 is at the low level within the range $2 \geq C > 0$ in terms of the digital value. On the other hand, the output from the threshold value detecting circuit 11 assumes the high level in the range of $C > 2$ in terms of the digital value.

Figure 9:
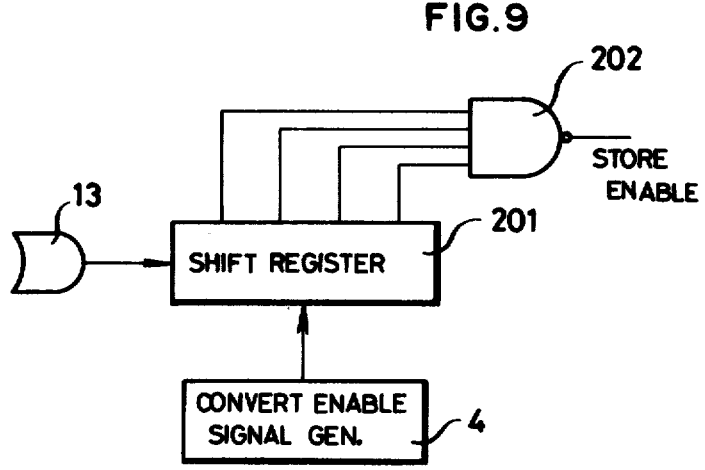
FIG. 9 is a block diagram of another embodiment which replaces the AND gate 14 and the monostable multivibrator of the FIG. 3 embodiment.

FIG. 9 is a block diagram of another embodiment which is to replace the portion of the AND gate 14 and the monostable multivibrator 15 in the FIG. 3 embodiment. Referring to FIG. 9, the output from the OR gate 13 is applied to a shift register 201 comprising four bit cells responsive to the conversion enabling signal for performing a shifting operation. Each bit cell of the shift register 201 is connected to the inputs to a NAND gate 202 after inversion. In operation, if and when the high level output is obtained from the OR gate 13 for a time period longer than the period of four conversion enable signals, it follows that the respective bit cells of the shift register 201 are all loaded with the logic one whereby the input condition of the NAND gate 202 is met and the low level output is obtained from the NAND gate 202. Therefore, a store enable signal is not obtained and the store circuit 6 is not enabled. When the low level output is obtained from the OR gate 13, the output from the NAND gate 202 assumes the high level. The high level output from the NAND gate 202 is applied as a store enable signal to the store circuit 6.

Although the present invention has been described and illustrated in detail, it is to be clearly understood that the same is by way of illustration and example only and is not to be taken by way of limitation, the spirit and scope of this invention being limited only by the terms of the appended claims.

What is claimed is:

1. An electronic weighing apparatus comprising; means responsive to a load being weighed for generating an electrical analog signal representative of the load, analog-digital converting means responsive to said electrical analog signal generating means for converting said electrical analog signal into an electrical digital signal representative of the load; memory means operatively coupled to said analog-digital converting means and responsive to a store enable signal for storing the electrical digital signal from said analog-digital converting means in said memory means, difference evaluating means responsive to said analog-digital converting means and to said memory means for providing a difference output by evaluating the difference between the electrical digital signal output from said analog-digital converting means and the electrical digital signal output from said memory means, digital display means operatively coupled to said difference evaluating means for displaying the output from said difference evaluating means in a digital manner, means connected to said memory means for providing a store enable signal to said memory means, said store enable signal providing means comprising means responsive to said difference evaluating means for detecting a zero state of said difference output from said difference evaluating means thereby providing a zero detected output, threshold value detecting means responsive to said difference evaluating means for detecting the level of the difference output from said difference evaluating means at a predetermined threshold value thereby providing a detected threshold value output, timing means operatively coupled to said zero detecting means and to said threshold value detecting means, said timing means being responsive to at least one of said zero detected output and said threshold value detected output whereby the timing means are triggered to perform a timing operation for a predetermined time duration, and further means responsive to said timing means for providing a store enable signal to said memory means for a time period other than said predetermined time duration.

2. The electronic weighing apparatus of claim 1, wherein said threshold value detecting means comprise means for presetting said predetermined threshold value, and means for comparing the threshold value output from said threshold value presetting means and the difference output from said difference evaluating means for providing an output when said difference output is larger than said threshold value.

3. The electronic weighing apparatus of claim 1, wherein said timing means comprises a time constant circuit.

4. The electronic weighing apparatus of claim 3, wherein said store enable signal providing means comprises monostable multivibrator means operatively coupled to said timing means.

5. The electronic weighing apparatus of claim 1, wherein said analog-digital converting means is constructed and arranged to provide a parallel bit output.

6. The electronic weighing apparatus of claim 5, wherein said memory means comprises register means constructed and arranged to write in and read out said electrical digital signal in a bit parallel fashion.

7. The electronic weighing apparatus of claim 6, wherein said difference evaluating means comprises complement adder means of a bit parallel input type.

8. The electronic weighing apparatus of claim 7, wherein said zero detecting means comprise full adder means of a bit parallel input type including a summand input to which the maximum value is applied, whereby the zero detection is made through the presence or absence of a carry output to be generated when an addend input exceeds zero.

9. The electronic weighing apparatus of claim 8, wherein said threshold value detecting means comprises magnitude comparator means of a bit parallel input type including comparing inputs, wherein one comparing input is supplied with said predetermined threshold value, whereby threshold value detection is effected through the presence or absence of a carry output to be obtained when the input to the other comparing input exceeds said threshold value.

10. The electronic weighing apparatus of claim 1, wherein said analog-digital converting means comprise means for periodically generating a conversion enable signal, and an analog-digital converter responsive to said conversion enable signal for converting said electrical analog signal into said electrical digital signal.

11. The electronic weighing apparatus of claim 10, which further comprises means responsive to the simultaneous occurrence of either said zero detected output or said threshold value detected output and said periodical conversion enable signal for triggering said timing means.

12. The electronic weighing apparatus of claim 11, wherein said store enable signal providing means comprises monostable multivibrator means operatively coupled to said timing means.

13. The electronic weighing apparatus of claim 11, wherein said store enable signal providing means comprises monostable multivibrator means operatively coupled to said timing means, and wherein said timing means comprise retriggerable means.

14. The electronic weighing apparatus of claim 11, wherein said analog-digital converting means is constructed and arranged to provide a parallel bit output.

15. The electronic weighing apparatus of claim 11, wherein said timing means comprise retriggerable means.

16. The electronic weighing apparatus of claim 15, wherein said timing means comprises time constant circuit means.

17. The electronic weighing apparatus of claim 15, wherein said timing means comprises means responsive to the output from said simultaneous occurrence responsive means for detecting a predetermined number of consecutive outputs from said simultaneous occurrence responsive means.

18. The electronic weighing apparatus of claim 17, wherein said consecutive output detecting means comprises shift register means responsive to the output from said simultaneous occurrence responsive means for performing a shifting operation as a function of said periodical conversion enable signal, and wherein said store enable signal providing means comprises means responsive to a stored state of said predetermined number of consecutive outputs in said shift register means for providing said store enable signal.

* * * * * output from said photodetecting means for pulsing the output into a pulse form.

9. The electronic weighing apparatus of claim 8, wherein said pulse train generating means further comprises a stationary grating member fixedly provided between said movable grating member and said photodetecting means, said stationary grating member being formed of two slits displaced in the displacement direction of said movable grating member, said photodetecting means comprises two photodetectors provided individually opposite to said two slits, and which further comprise means responsive to the outputs from said two photodetectors for detecting the direction of the movement of said movable grating member.

10. The electronic weighing apparatus of claim 1, in which said tare weight deducting means comprises tare weight deduction signal providing means responsive to simultaneous outputs from said enabling signal providing means and from said tare weight deduction instructing means for providing a tare weight deduction signal, and resetting means responsive to said tare weight deduction signal for resetting said electrical signal providing means.

11. The electronic weighing apparatus of claim 10, wherein said electrical signal providing means comprises means responsive to the displacement of said displacement means for generating a pulse train having a number of pulses representing the displacement of said displacement means, and means operatively coupled to said pulse train generating means for counting the number of pulses of said pulse train.

12. The electronic weighing apparatus of claim 11, wherein said enabling signal providing means comprises monostable multivibrator means operatively coupled to said pulse train generating means for assuming one state for a first predetermined time period and thereafter assuming another state, delay means operatively coupled to said monostable multivibrator means and responsive to said one state thereof for providing a delay output signal with a second predetermined time period, and means responsive to the simultaneous outputs of said delay means and the other state output of said monostable multivibrator means for providing a logical product signal as said enabling signal.

13. The electronic weighing apparatus of claim 11, wherein said enabling signal providing means comprises means operatively coupled to said pulse train generating means and responsive to the presence of pulses for defining a predetermined time period following said presence of pulses, and means operatively coupled to said predetermined time period defining means for providing said enabling signal after said predetermined time period as said enabling signal.

14. The electronic weighing apparatus of claim 13, wherein said enabling signal providing means comprises further means operatively coupled to said pulse train generating means and responsive to the absence of pulses for providing a further enabling signal, and means responsive to simultaneous outputs of said first mentioned and further enabling signal providing means for providing a logical product output as said enabling signal.

15. The electronic weighing apparatus of claim 11, wherein said enabling signal providing means comprises pulse absence detected signal providing means operatively coupled to said pulse train generating means and responsive to said pulse train for detecting the absence of the pulses for providing a pulse absence detected signal, and delay means operatively coupled to said pulse absence detected signal providing means for delaying said pulse absence detected signal for a predetermined delay period of time for providing said enabling signal.

16. The electronic weighing apparatus of claim 15, wherein said delay means comprises storage means responsive to said pulse train for being rapidly charged or discharged and being slowly discharged or charged with a predetermined time constant, and means operatively coupled to said storage means for level detecting the output from said storage means.

17. The electronic weighing apparatus of claim 15, wherein said enabling signal providing means further comprises means responsive to said pulse train for generating a triggering pulse for triggering said delay means.

18. The electronic weighing apparatus of claim 17, wherein said triggering pulse generating means comprises monostable multivibrator means responsive to said pulse train and having a first and a second output terminal which are complementary to each other, said first output terminal of said monostable multivibrator means being coupled to said delay means, said second output terminal of said monostable multivibrator means constituting said pulse absence detected signal providing means.

* * * * *